United States Patent
Kondaveeti

(10) Patent No.: US 11,233,806 B2
(45) Date of Patent: Jan. 25, 2022

(54) TECHNIQUES AND ARCHITECTURES FOR PRIVILEGE ESCALATION DETECTION

(71) Applicant: salesforce.com, inc., San Francisco, CA (US)

(72) Inventor: Anirudh Kondaveeti, San Jose, CA (US)

(73) Assignee: salesforce.com, Inc., San Francisco, CA (US)

( * ) Notice: Subject to any disclaimer, the term of this patent is extended or adjusted under 35 U.S.C. 154(b) by 710 days.

(21) Appl. No.: 16/011,487

(22) Filed: Jun. 18, 2018

(65) Prior Publication Data
US 2019/0387009 A1 Dec. 19, 2019

(51) Int. Cl.
*H04L 29/06* (2006.01)

(52) U.S. Cl.
CPC ........ *H04L 63/1425* (2013.01); *H04L 63/102* (2013.01); *H04L 63/20* (2013.01)

(58) Field of Classification Search
CPC ... H04L 63/1425; H04L 63/102; H04L 63/20; H04L 63/1408; H04L 63/1416; H04L 63/10; H04L 43/045; H04L 43/06; H04L 67/22; H04L 67/306; H04L 41/16; G06F 21/554; G06F 21/552; G06F 21/604; G06F 16/9024; G06F 2221/2141
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |

(Continued)

OTHER PUBLICATIONS

"Authentication graphs: Analyzing user behavior within an enterprise network". Alexander D. Kent, Lorie M. Liebrock, Joshua C. Neil.

(Continued)

*Primary Examiner* — Brian F Shaw
(74) *Attorney, Agent, or Firm* — Kwan & Olynick LLP

(57) ABSTRACT

Techniques and architectures for privilege escalation detection. User login information for multiple users in a multiuser secure computing environment is analyzed to generate multiple user evaluations. The multiple user evaluations are analyzed to generate at least a population evaluation for the multiuser secure computing environment. Node scores are generated for nodes in the population evaluation to determine one or more entry nodes for the multiple users in the multiuser secure computing environment. The node scores are compared to one or more threshold values to determine whether the user login information corresponding to one or more of the multiple users indicates a privilege escalation condition. A security response action occurs in response to detecting a privilege escalation condition.

20 Claims, 6 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 10,419,469 B1 * | 9/2019 | Singh .................. H04L 67/306 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2012/0246720 A1 * | 9/2012 | Xie .................. H04L 51/12 726/22 |
| 2017/0359376 A1 * | 12/2017 | Evron ................ H04L 63/1491 |
| 2018/0367548 A1 * | 12/2018 | Stokes, III ............ H04L 63/145 |

OTHER PUBLICATIONS

"Connected components and credential hopping in authentication graphs". Aric Hagberg, Nathan Lemons, Alex Kent, Joshua Neil.

"Differentiating user authentification graphs". Alexander D. Kent, Lorie M. Liebrock.

* cited by examiner

TECHNIQUES AND ARCHITECTURES FOR PRIVILEGE ESCALATION DETECTION

TECHNICAL FIELD

Embodiments relate to techniques for providing security functionality in complex computing environments. More particularly, embodiments relate to techniques for more accurately monitoring and flagging inappropriate privilege level changes in a computing environment.

BACKGROUND

The concept of "privilege escalation" refers to situations in which a user receives privileges that they are not entitled to have. Privilege escalation can be the source of a security lapse and can result in loss of sensitive data and/or control of a secure computing environment.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

As discussed above, privilege escalation refers to a user receiving privileges that they are not entitled to receive. Various techniques and architectures described herein provide mechanisms to detect privilege escalation and to find the source host corresponding to the first point of entry for each user. If the first point of entry for a user is unusual, for example, there could be a corresponding possible privilege escalation.

As an example, if a user (U1) logs in to Host A, Host B and Host C in that order the first point of entry is Host A. If, for example, the user changes user names to U2 and logs in from Host C to Host D, then the first point of entry for U2 is Host C. If, based on domain knowledge, for example, Host C cannot be the first point of entry for any user, there may have been a privilege escalation for U2.

Figure 1:
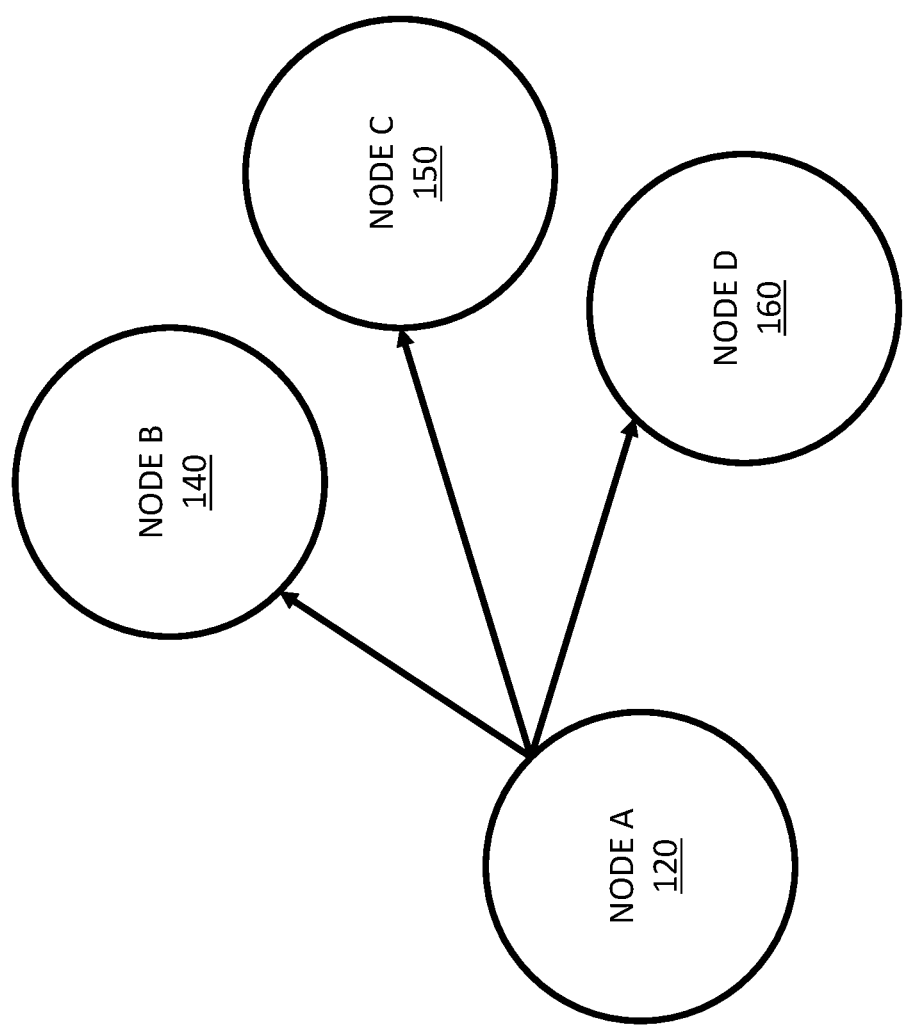
FIG. 1 provides an example user graph that can be created based on the example provided herein.

In one embodiment, a user graph can be constructed for each user based on login activity. FIG. 1 provides an example user graph that can be created based on the example provided herein. While the example of FIG. 1 is a simple example, the complexity of the graphs that can be generated is unlimited. In one embodiment, a graph is constructed for each user based on login activity, for example, from Secure Shell (SSH) login activity.

SSH is but one example of a cryptographic network protocol for operating network services securely over an unsecured network. SSH functions to provide a secure channel over an unsecured network in a client-server arrangement. Different protocols can also be supported.

The resulting graph is the user graph (UG) illustrated in FIG. 1, which is for a single user for a specific time period (e.g., one day, one work shift, a weekend). In the example of FIG. 1, the user logged into destination hosts B (140), C (150) and D (160) from source host A (120). In one embodiment, a directed link is created from the source host (e.g., 120) to the destination host (e.g., 150). Each circle in the graph of FIG. 1 represents a node and each line the graph is an edge. The edges have a specific direction.

Figure 2:
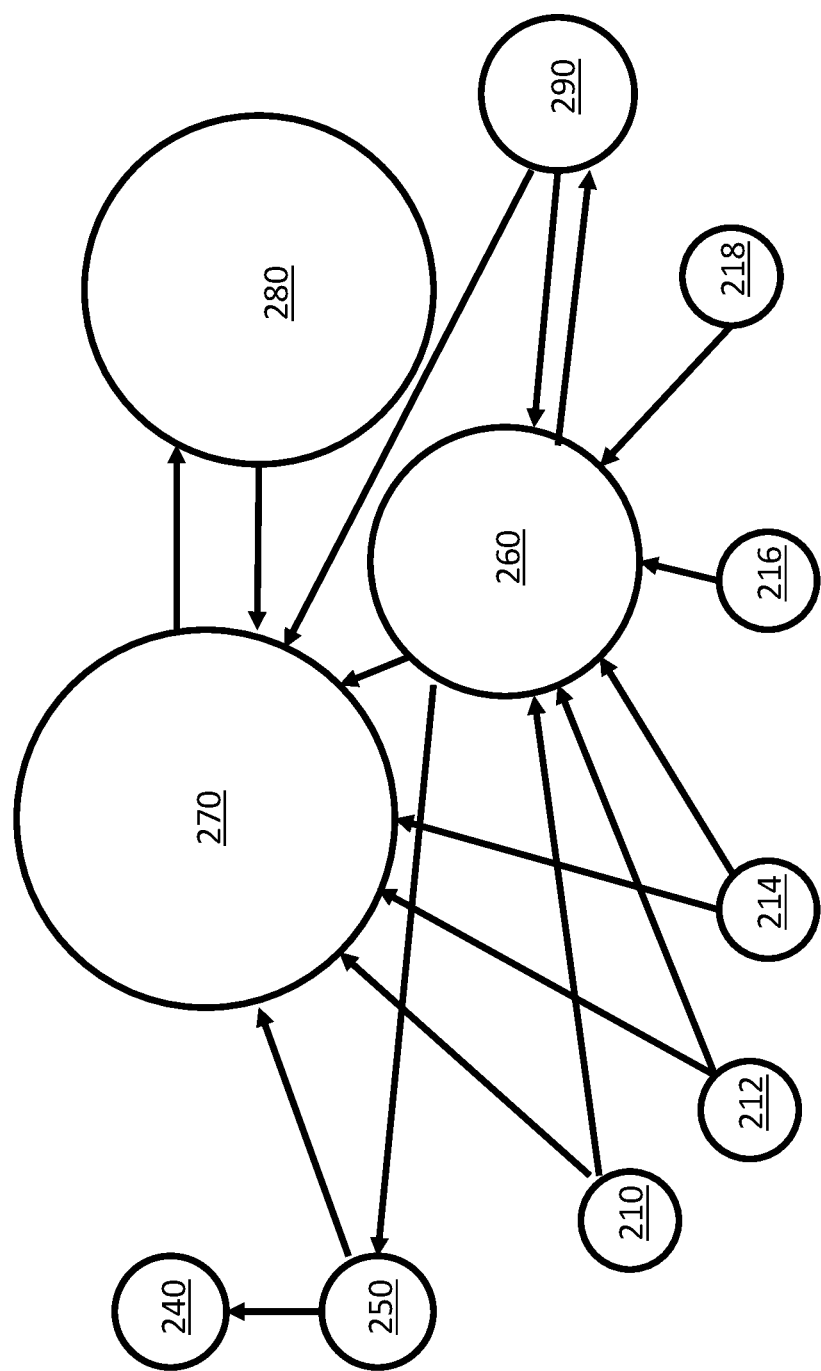
FIG. 2 illustrates an example population graph.

In various embodiments, another graph is constructed from login activity corresponding to all users of interest. This graph is called the population graph (PG). FIG. 2 illustrates an example population graph. The users of interest can be, for example, all users in a multitenant environment, all users of a specified class, all users for one or more tenants of the multitenant environment, etc. The nodes of the population graph correspond to hosts and the edges correspond to links between hosts.

In one embodiment, the population graph contains a link from a first node to a second node if at least one user has logged in from the first node to the second node. In one embodiment, the population graph is a super set of individual user graphs as it contains all possible hosts accessed by all users of interest.

Various strategies can be used to find the first point of entry for a graph. One example strategy that can be used is known as PageRank, which was originally developed to rank website importance based on numbers of links to the site and quality of the links. In one embodiment, nodes in the user graph and the population graph that correspond to a first point of entry have outgoing links to other nodes but do not have any incoming links.

In one embodiment, the PageRank strategy can be utilized to identify "less popular" nodes in the population graph. Less popular nodes are those that have outgoing edges but do not have incoming edges. The PageRank strategy can be used to score each node based on the number of incoming edges to the node and outgoing edges from the node. The resulting scores can be used to differentiate "less popular" nodes in the population graph. In alternate embodiments, nodes with zero incoming edges and a positive number of outgoing edges can be identified as "less popular" nodes.

Nodes in the user graphs (e.g., FIG. 1) and population graph (e.g., FIG. 2) that correspond to a first point of entry have outgoing links to other nodes, but do not have any incoming links. As a result, in the PageRank (or similar) embodiment, they have the lowest PageRank score compared to other nodes in the graph. By identifying the nodes with the lowest popularity (e.g., lowest PageRank score), the first point of entry hosts can be identified.

The example of FIG. 2 provides mathematical PageRank scores for a simple network. The example of FIG. 2 is expressed in percentages, but other scoring formats can be used, for example, a logarithmic scale, a linear scale, a rank ordering, etc. In the example of FIG. 2, Node C has a higher score than Node E, but Node C has fewer links than Node E. The link to Node C has a greater weight than links to Node E, so it has a higher value.

Figure 3:
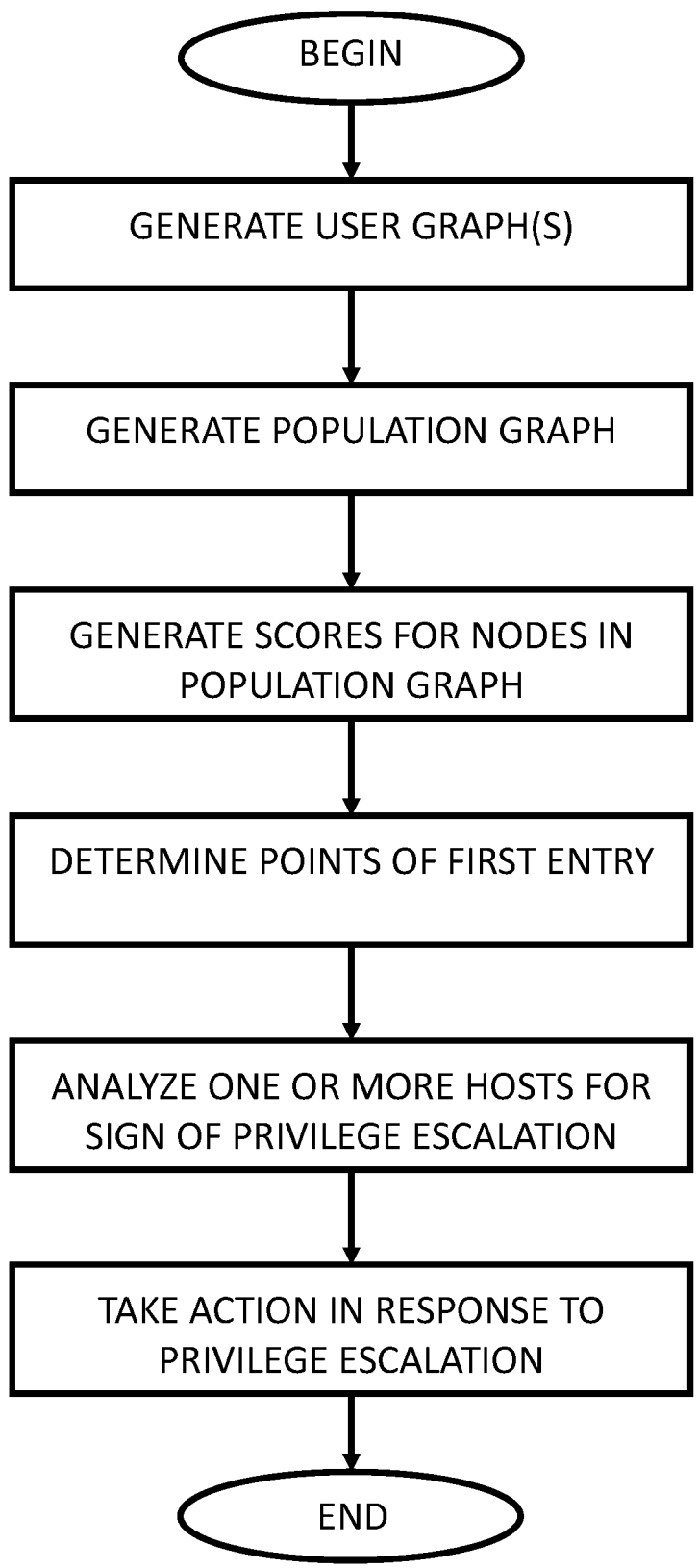
FIG. 3 is a flow diagram of one embodiment of a technique to identify potential privilege escalation.

FIG. 3 is a flow diagram of one embodiment of a technique to identify potential privilege escalation. In one embodiment, the technique described with respect to FIG. 3 can be provided within a multitenant environment. Various embodiments of multitenant environments are described in greater detail below. In other embodiments, the techniques described herein can be utilized in other types of environments.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

In one embodiment, one or more user graphs (UGs) are generated, 310. The user graphs can be constructed based on user login activity. For example, a user graph can be generated for all users of an environment. Alternatively, a subset of users can be monitored and user graphs can be generated for that subset of users. The user graph(s) can be generated as discussed above.

In one embodiment, a population graph (PG) is generated for the user graph, 320. The population graph is also generated based on login activity and indicates links between hosts within the environment. The population graph can be generated as discussed above.

In one embodiment, one or more scores can be generated for nodes in the population graph, 330. In an embodiment utilizing a PageRank analysis, scores for each host (H) can be calculated. This can be referred to as R_Population. As discussed above, other techniques can be utilized to generate scores for the nodes.

In one embodiment, or each user graph, scores are generated for nodes to determine points of first entry, 340. In an embodiment utilizing the PageRank analysis, for each user graph of a user (U), the hosts (H) corresponding to points of first entry are determined as described above. These hosts have the lowest scores denoted by R_Minimum.

In one embodiment, one or more hosts are analyzed for signs of privilege escalation, 350. In an embodiment utilizing the PageRank analysis, for each host in H, if R_Minimum<R_Population, then there is a possible privilege escalation for user U on host H.

In one embodiment in response to a possible privilege escalation, an action is taken, 360. The action can be, for example, notification to a system or tenant administrator. As another example, the action can be an automatic restriction on user U and/or other users.

Figure 4:
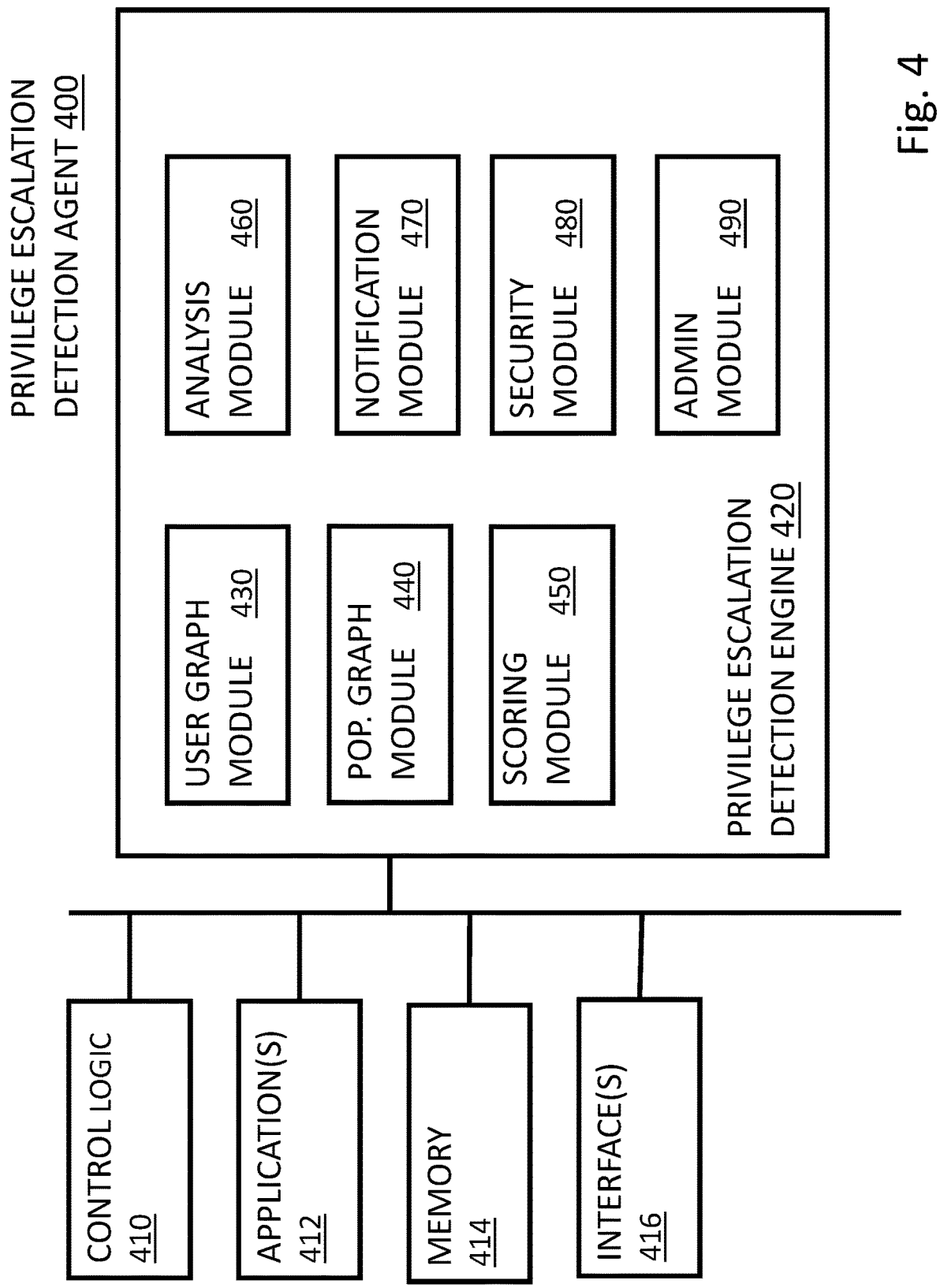
FIG. 4 is a block diagram of one embodiment of an agent to detect privilege escalation.

FIG. 4 is a block diagram of one embodiment of an agent to detect privilege escalation. In one embodiment, one or more privilege escalation detection agents may exist and/or operate within the host environment. The agent of FIG. 4 may provide privilege escalation detection functionality as described, for example, with respect to FIGS. 1-3. The agent of FIG. 4 may also provide additional functionality.

In one embodiment, privilege escalation detection agent 400 includes control logic 410, which implements logical functional control to direct operation of privilege escalation detection agent 400, and/or hardware associated with directing operation of privilege escalation detection agent 400. Logic may be hardware logic circuits and/or software routines. In one embodiment, privilege escalation detection agent 400 includes one or more applications 412, which represent a code sequence and/or programs that provide instructions to control logic 410.

Privilege escalation detection agent 400 includes memory 414, which represents a memory device and/or access to a memory resource for storing data and/or instructions. Memory 414 may include memory local to privilege escalation detection agent 400, as well as, or alternatively, including memory of the host system on which privilege escalation detection agent 400 resides. Privilege escalation detection agent 400 also includes one or more interfaces 416, which represent access interfaces to/from (an input/output interface) privilege escalation detection agent 400 with regard to entities (electronic or human) external to privilege escalation detection agent 400.

Privilege escalation detection agent 400 also includes privilege escalation detection engine 420, which represents one or more functions or module that enable privilege escalation detection agent 400 to provide the index backups as described above. The example of FIG. 4 provides several modules that may be included in privilege escalation detection engine 420; however, different and/or additional modules may also be included. Example modules that may be involved in providing the privilege escalation detection functionality include user graph module 430, population graph module 440, scoring module 450, analysis module 460, notification module 470, security module 480 and administration module 490. Each of these modules may further include other sub-modules to provide other functions. As used herein, a module refers to routine, a subsystem, logic circuit, microcode, etc., whether implemented in hardware, software, firmware or some combination thereof.

User graph module 430 operates to generate the user graph(s), for example, as described with respect to FIG. 1. In various embodiments, user graph module 430 can generate user graphs for any number of users. In one embodiment, a user graph is generated for each user associated with the host environment. In one embodiment, user graph module 430 utilizes one or more SSH logs to generate the user graphs; however, in other embodiments, different raw data can be utilized to generate the user graphs.

Population graph module 440 operates to generate the population graph, for example, as described with respect to FIG. 2. In one embodiment, the population graph is generated utilizing a user graph for each user of the host environment. In alternate embodiments, population subsets can be analyzed utilizing user graphs for subsets of users.

Scoring module 450 operates to perform analysis of population graphs and/or user graphs to generate scores for various nodes in the host environment. In one embodiment, a score is generated for each node. The score provides an indication of whether the corresponding node is a point of first entry for one or more users. As discussed above, a PageRank (or similar) analysis can be performed on the population graph to determine scores for nodes of the population graph. In other embodiments, the number of incoming and outgoing links (or the difference between the incoming and outgoing links) can also be utilized to generate the score.

Analysis module 460 operates to perform analysis based on scores generated by scoring module 450. In one embodiment, analysis module 460 operates to utilize the scores to determine if a potential privilege escalation has occurred. As discussed above, in one embodiment, if R_Minimum<R_Population, then there is a possible privilege escalation. In alternate embodiments, other thresholds and/or parameters can be utilized to determine if privilege escalation has occurred.

Notification module 470 operates to notify one or more parties in response to a privilege escalation condition. For example, a host environment system administrator can be notified of all privilege escalation conditions in the host environment. As another example, a tenant system administrator can be notified of a privilege escalation condition related to the corresponding tenant and/or users.

Security module 480 can operate to take automatic actions in response to determination of a privilege escalation condition. For example, login privileges for a user corresponding to the privilege escalation can be disabled until reviewed and reenabled by a system administrator. Alternatively, the login privileges can be disabled for a pre-selected period of time.

Administration module 490 can operate to allow different tenants or different users to have different thresholds/scores to indicate a privilege escalation condition. Using the example formula above, R_Minimum can be different for different tenants in a multitenant environment. In other embodiments, the thresholds can be global but adjustable to provide the desired security level.

Figure 5:
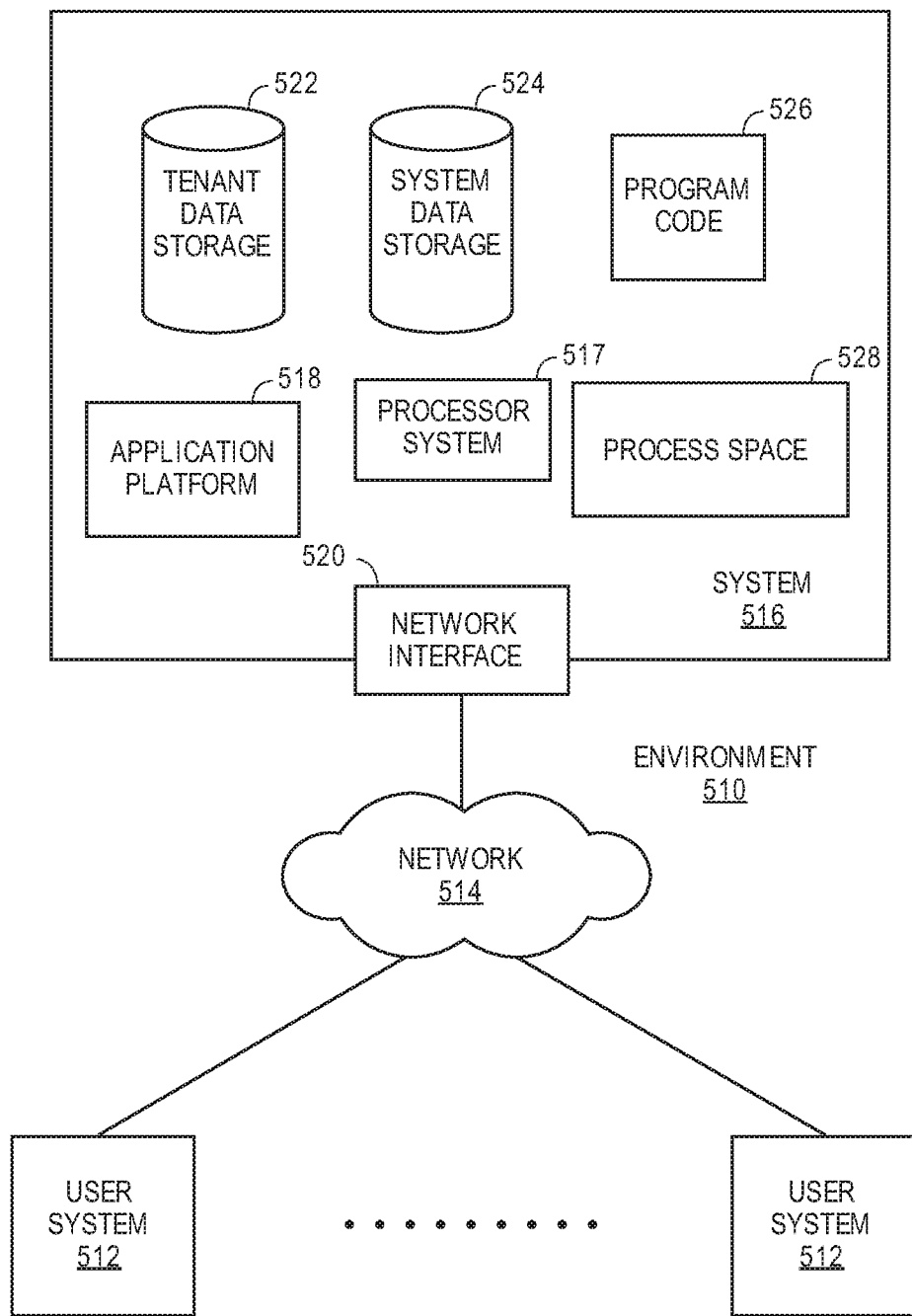
FIG. 5 illustrates a block diagram of an environment where an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in herein FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Core series processor or the like. Similarly, system 516 (and additional instances of an MTS, where more than one is present) and all of their components might be operator configurable using application(s) including computer code to run using a central processing unit such as processor system 517, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
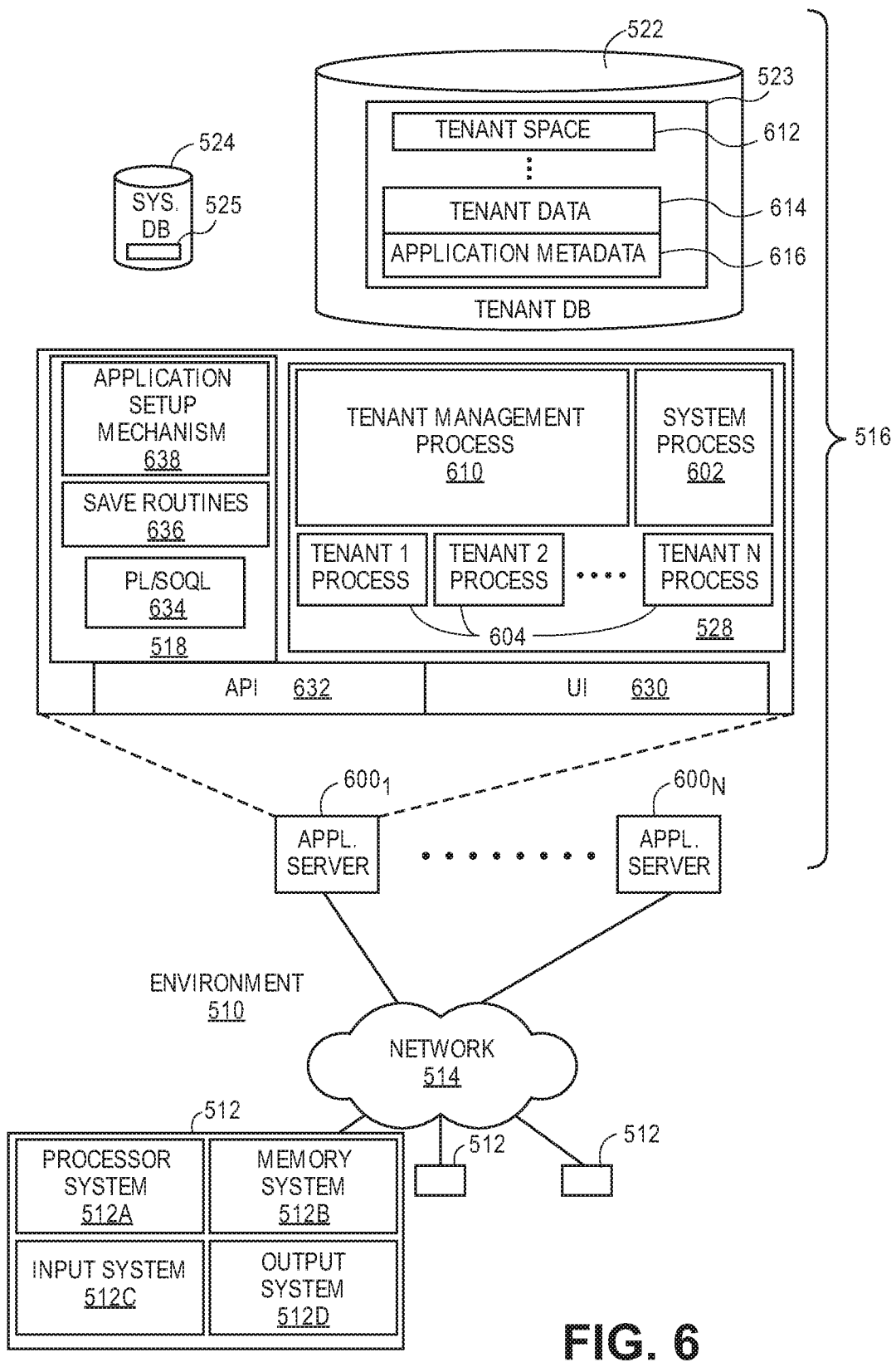
FIG. 6 illustrates a block diagram of an environment where an on-demand database service might be used.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage space 612, tenant data 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage spaces 612, which can be either a physical arrangement and/or a logical arrangement of data. Within each tenant storage space 612, tenant data 614 and application metadata 616 might be similarly allocated for each user. For example, a copy of a user's most recently used (MRU) items might be stored to tenant data 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 BIG-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described but can be practiced with modification and alteration within the spirit and scope of the appended claims. The description is thus to be regarded as illustrative instead of limiting.

What is claimed is:

1. A non-transitory computer-readable medium having stored thereon instructions that, when executed by one or more processors, are configurable to cause the one or more processors to:
   analyze user login information for multiple users in a multiuser secure computing environment to generate multiple user graphs that each correspond to single users for a specific time period;
   analyze at least the multiple user graphs to generate at least a population graph from login activity corresponding to the multiple users;
   generate node scores for nodes in the population graph to determine one or more entry nodes for the multiple users in the multiuser secure computing environment, wherein the node scores are based at least on graph entry points and node outgoing links to other nodes;
   compare the node scores to one or more threshold values to determine whether the user login information corresponding to one or more of the multiple users indicates an unauthorized privilege escalation condition; and
   cause a security response action to occur in response to detecting a privilege escalation condition.

2. The non-transitory computer-readable medium of claim 1 wherein the multiple user evaluations comprise multiple user graphs.

3. The non-transitory computer-readable medium of claim 1 wherein the at least one population evaluation comprises at least one population graph.

4. The non-transitory computer-readable medium of claim 1 wherein the node scores are generated utilizing a PageRank strategy.

5. The non-transitory computer-readable medium of claim 1 wherein the node scores are based on a difference between incoming connections and outgoing connections for corresponding nodes.

6. The non-transitory computer-readable medium of claim 1 wherein the node scores are based on a number of incoming connections for corresponding nodes.

7. The non-transitory computer-readable medium of claim 1 wherein the security response action comprises sending a notification to a system administrator.

8. The non-transitory computer-readable medium of claim 1 wherein the security response action automatically, and without system administrator action, disabling login functionality for users corresponding to the privilege escalation condition.

9. A computer-implemented method comprising:
   analyzing user login information for multiple users in a multiuser secure computing environment to generate multiple user graphs that each correspond to single users for a specific time period;
   analyzing at least the multiple user graphs to generate at least a population graph from login activity corresponding to the multiple users;
   generating node scores for nodes in the population graph to determine one or more entry nodes for the multiple users in the multiuser secure computing environment, wherein the node scores are based at least on graph entry points and node outgoing links to other nodes;
   comparing the node scores to one or more threshold values to determine whether the user login information corresponding to one or more of the multiple users indicates an unauthorized privilege escalation condition; and
   causing a security response action to occur in response to detecting a privilege escalation condition.

10. The method of claim 9 wherein the multiple user evaluations comprise multiple user graphs.

11. The method of claim 9 wherein the at least one population evaluation comprises at least one population graph.

12. The method of claim 9 wherein the node scores are generated utilizing a PageRank strategy.

13. The method of claim 9 wherein the node scores are based on a difference between incoming connections and outgoing connections for corresponding nodes.

14. The method of claim 1 wherein the node scores are based on a number of incoming connections for corresponding nodes.

15. The method of claim 9 wherein the security response action comprises sending a notification to a system administrator.

16. The method of claim 9 wherein the security response action automatically, and without system administrator action, disabling login functionality for users corresponding to the privilege escalation condition.

17. A system comprising:
a storage system;
one or more hardware processors coupled with the storage system the one or more hardware processors configurable to analyze user login information for multiple users in a multiuser secure computing environment to generate multiple user graphs that each correspond to single users for a specific time period, to analyze at least the multiple user graphs to generate at least a population graph from login activity corresponding to the multiple users, to generate node scores for nodes in the population graph to determine one or more entry nodes for the multiple users in the multiuser secure computing environment, wherein the node scores are based at least one graph entry points and node outgoing links to other nodes, to compare the node scores to one or more threshold values to determine whether the user login information corresponding to one or more of the multiple users indicates an unauthorized privilege escalation condition, and to cause a security response action to occur in response to detecting a privilege escalation condition.

18. The system of claim 17 wherein the multiple user evaluations comprise multiple user graphs.

19. The system of claim 17 wherein the at least one population evaluation comprises at least one population graph.

20. The system of claim 17 wherein the node scores are based on a difference between incoming connections and outgoing connections for corresponding nodes.

* * * * *